Figure 1:
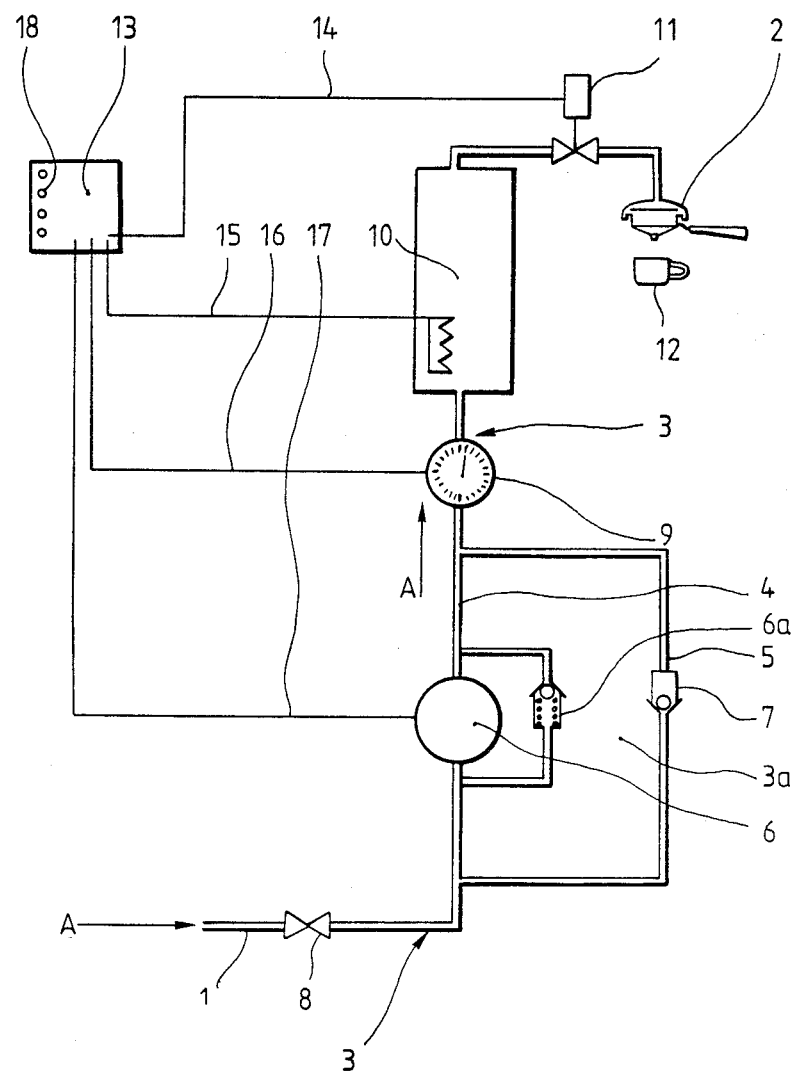

United States Patent [19]

Dangel et al.

[11] Patent Number: 4,583,449
[45] Date of Patent: Apr. 22, 1986

[54] COFFEE PERCOLATOR FOR SELECTIVELY MAKING NORMAL COFFEE OR ESPRESSO

[75] Inventors: Artur Dangel, Bad Überkingen; Josef Frech, Gerstetten; Willi Niess, Lansee-Halzhausen, all of Fed. Rep. of Germany; Rolf Prillipp, deceased, late of Bad Überkingen, Fed. Rep. of Germany, by Inge Prillipp, Hanno Prilipp, Freia Prilipp, heirs; Hermann Riegert, Treffelhausen, Fed. Rep. of Germany; Gerhard Wittlinger, Geislingen, Fed. Rep. of Germany; Siegfried Anderl, Amstetten, Fed. Rep. of Germany

[73] Assignee: Wurttembergische Metallwarenfabrik AG, Fed. Rep. of Germany

[21] Appl. No.: 605,111

[22] Filed: Apr. 30, 1984

[30] Foreign Application Priority Data

May 3, 1983 [DE] Fed. Rep. of Germany ....... 3316158

[51] Int. Cl.$^4$ .................. A47J 31/30; A47J 31/34
[52] U.S. Cl. ........................ 99/279; 99/284; 99/302 R
[58] Field of Search ............ 99/280, 300, 301 R, 99/279, 284, 293, 291, 294; 426/433

[56] References Cited

U.S. PATENT DOCUMENTS 4,137,833 2/1979 Yellox .
4,242,568 12/1980 Gurtner .................. 99/280

FOREIGN PATENT DOCUMENTS 3133903 11/1982 Fed. Rep. of Germany .

Primary Examiner—Robert W. Jenkins
Attorney, Agent, or Firm—Arnold, White & Durkee

[57] ABSTRACT

The invention relates to a coffee percolator for selectively making normal coffee or espresso, comprising a water flow path extending between a cold water supply inlet and a brewing unit, said flow path being divided into a first branch including a pressure pump, and a second branch including a valve adapted to close or be closed in the espresso making mode, and further comprising control means for activating said valve(s) and/or said pump in response to the selection of the type of coffee to be made. The invention is directed towards the provision of a coffee percolator of this type, which is of simplyfied and economic construction and substantially failure-proof. This is achieved by providing that the flow path is employed in common for the water used for making espresso and normal coffee, and is only divided adjacent the pump into the first flow path branch including the pump and the second flow path branch forming a bypass across the pump. This construction eliminates a considerable number of connection and sealing points along the flow path and at the metering and heating devices, resulting in the elimination of potential failure at these locations.

12 Claims, 2 Drawing Figures

COFFEE PERCOLATOR FOR SELECTIVELY MAKING NORMAL COFFEE OR ESPRESSO

DESCRIPTION

The present invention relates to a coffee percolator of the type defined in the generic clause of claim 1.

A coffee percolator of this type is known from DE-PS No. 3,133,903. A first and a second flow path branch thereof extend independently from each other from a metering chamber functioning as a metering device to the brewing unit. The second branch forms a direct flow path from the metering chamber to the brewing unit and merely includes a check valve closing in the opposite direction of flow, and opening for the making of normal coffee, in which case the coffee-making water is expelled from the metering chamber by steam pressure to flow through the second flow path branch. For making espresso, water from the metering chamber is aspirated by the pump and supplied under pressure to the brewing chamber through a heat exchanger, a three-way valve, and a check valve included in the first branch. In the brewing chamber, the water is forced under pressure through the coffee meal, the check valve included in the second branch being kept closed by the pressure created in the brewing chamber. A bypass valve associated with the pump functions to protect the latter by opening in response to excessive pressure possibly caused by a flow restriction due to the coffee meal being too finely ground.

In addition to these flow path branches extending separately from the metering device to the brewing chamber, and the specific elements associated therewith, the known coffee percolator includes further subdivisions of the water flow path in combination with further elements for use in the making of one type of coffee or serving to perform varying functions in the making of both types of coffee. A first flow path section including an inlet valve extends from the cold water supply inlet to a hot water reservoir. A steam conduit and a hot water conduit, each provided with a controllable valve, lead from the hot water reservoir to the metering chamber. The steam conduit is exclusively used in the making of normal coffee, and that twice during each brewing process. Prior to the supply of hot water thereto, the metering chamber is pre-heated by means of hot steam, while a metering chamber venting valve is in its open state. After the metering chamber has been filled via the hot water conduit with a selected amount of water, the venting valve is closed, and steam pressure is supplied for expelling the hot water from the metering chamber to flow to the brewing chamber through the second flow path branch.

For the preparation of espresso, only a fraction of the required amount of water is supplied from the hot water reservoir to the metering chamber through the hot water conduit. The remaining amount is supplied to the metering chamber through a cold water conduit leading from the cold water supply inlet directly to the metering chamber and including a separate inlet valve and a metering device. Further in the preparation of espresso, the hot water reservoir functions as a heat exchanger cooperating with a section of the second flow path branch extending therethrough.

The known coffee percolator is thus extremely complicated. The construction of the numerous conduits and the connection and sealing arrangements associated therewith is not only expensive, but also prone to failure. The hot water reservoir, which also serves for generating the steam pressure, is in communication with three conduits, and the first flow path branch passes through its walls at two locations. In addition, each of the various flow path branches and conduits includes at least one valve. Control means are provided for opening or closing most of these valves depending on the type of coffee to be made. This requires the employ of control means of complicated design and the provision of numerous control connections. The possibility of employing a single coffee percolator for making two types of coffee thus appears to have been paid for at an excessive price as compared to the employ of two separate appliances.

It is therefore an object of the present invention to provide a coffee percolator of the type defined in the introduction, which is of simplified construction and thus economical as well as substantially failure-proof.

This object is attained according to the invention by the characterizing features set forth in claim 1.

The provision of a single flow path for making both types of coffee requires a reduced number of conduits and valves, with a corresponding saving of control devices. The pump bypass formed by the second flow path branch requires only two connections of this branch to the main flow path. Further branches and connections are not required. The metering and heating means are likewise connected each to only one incoming and outgoing conduit. This results in diminished sealing problems in assembly and use of the apparatus, and thus in a reduced risk of failure. The claimed arrangement, moreover, lends itself to compact construction.

An advantageously simple embodiment as regards to its construction and operation is characterized by the features of claim 2. After initiation of the coffee-making process, particularly by opening the inlet valve, the water used for making normal coffee opens the check valve included in the second flow path branch by its flow pressure and is thus enabled to flow through the second flow path branch, while the first branch is kept closed by the pump. For making espresso, the pump is activated, resulting in a pressure of about 10 bar being created in the section between the pump and the brewing unit. This pressure is effective to close the check valve included in the secong branch so as to prevent any backflow of water from occurring.

An embodiment as disclosed in claim 3 ensures a maximum of economical utilization of heating energy in that only the amount of water required for the selected amount of coffee to be made is heated. The flow path of the heated water to the brewing unit is short and does not contain any heat-dissipating elements, with the possible exception of the inlet valve.

A structurally simple embodiment of a metering device, for instance in the form of a flow meter, is suggested by the characteristic of claim 4. There is no metering chamber required.

A further embodiment is characterized by the features disclosed in claim 6. In this embodiment, the water for making normal coffee is likewise force-fed by the same pump also employed for generating the pressure for making espresso. Pressure compensation is accomplished by means of a suitably adjustable choke means associated with the valve included in the second flow path branch. This coffee percolator is thus independent of the water supply pressure. It is moreover possible to include a metering chamber upstream of the divided section of the flow path. No further control elements or the like are required between the pump and the through-flow heater and between the latter and the brewing chamber unit. Also in this case, the pump is activated and deactivated for each type of coffee making process, thus eliminating the need for a switching arrangement for selecting the operating mode with respect to the type of coffee to be made.

The characteristic of claim 7 ensures the generation of pressure for the preparation of espresso.

Figure 2:
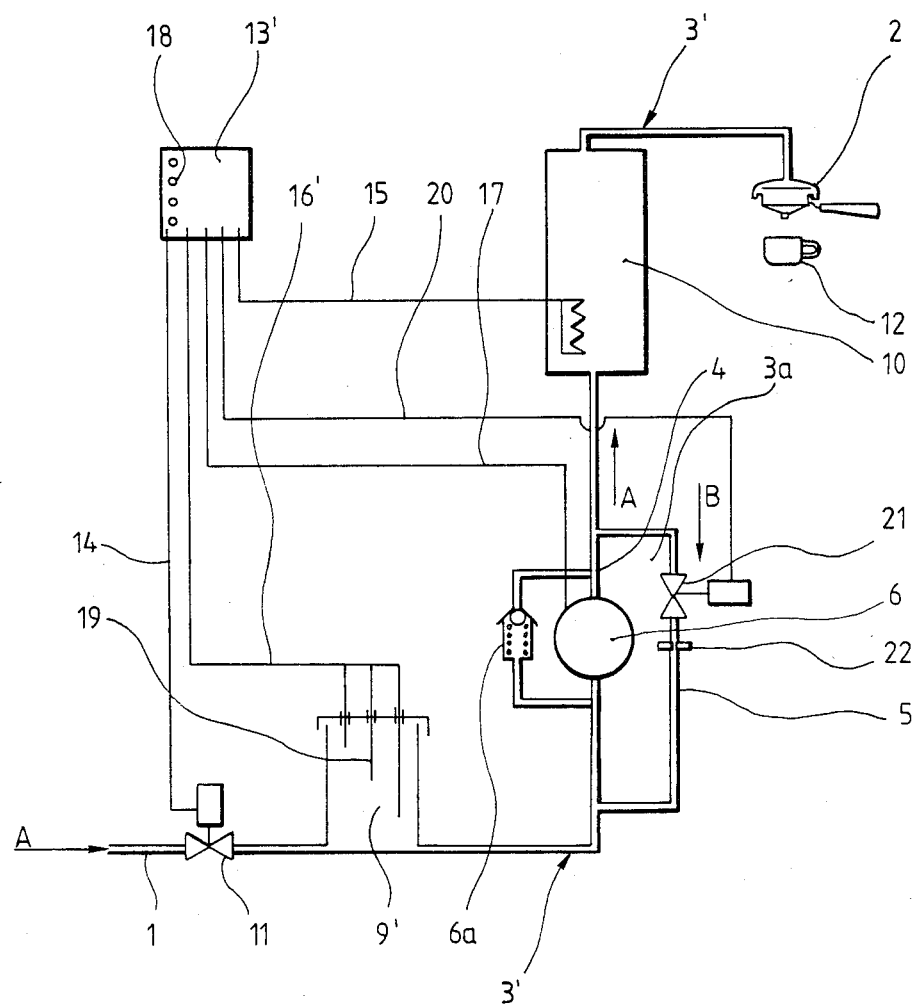

Embodiments of the invention shall now be descriebd by way of example with reference to the accompanying drawings, wherein:

FIG. 1 shows a construction diagram of a coffee percolator as a first embodiment of the invention, and FIG. 2 shows a construction diagram of a coffee percolator representing a second embodiment of the invention.

The coffee percolator diagrammatically shown in FIG. 1 comprises a cold water supply inlet 1 and a brewing unit 2, with a flow path generally indicated at 3 extending therebetween. Flow path 3 includes a divided section 3a consisting of a first branch 4 and a second branch 5. First branch 4 includes a pump 6 associated with a bypass valve serving as a pressure relief valve. Second branch 5 is formed as a bypass across pump 6 and includes a check valve 7 adapted to close against the direction of flow A from cold water supply inlet 1.

In the direction of flow A from cold water supply inlet 1, flow path 3 further includes a pressure reducer 8 upstream of divided section 3a, and a metering device 9, in the present case in the form of a flow meter, and a through-flow heater 10 downstream of the divided section. Located between through-flow heater 10 and brewing unit 2 is an inlet valve 11. Diagrammatically shown is a coffee receptacle 12 located below brewing unit 2.

The coffee percolator is equipped with control means 13 shown in FIG. 1 as a switchbox 13. Control lines 14, 15, 16, and 17 connect control means 13 to inlet valve 11, through-flow heater 10, metering device 9, and pump 6, respectively.

The described coffee percolator operates as follows for preparing a desired type and amount of coffee:

The selection is made by depressing one of the pushbutton switches indicated at 18. If the selected mode is for making normal coffee, control means 13 is activated to enenrgize through-flow heater 10 and to open inlet valve 11. This permits water to flow from cold water supply inlet 1 through pressure reducer 8, second flow path branch 5, check valve 7, which is opened by the water pressure, metering device 9, through-flow heater 10 and inlet valve 11 towards brewing unit 2. Metering unit 9 is set to the selected amount of coffee via control line 16. As soon as the selected amount of water has flown through metering device 9, control means 13 is activated to close inlet valve 11 and to deenergize through-flow heater 10.

If cream coffee has been selected, control means 13 is activated to additionally start pump 6. The latter forcefeeds the water in the direction of arrow A through flow path branch 4 so as to generate therein a pressure of about 10 bar required for the preparation of cream coffee. This pressure acts on the closing side of check valve 7 so as to keep it in the closed state against the normal water supply pressure. For the remainder, the process is similar to that for making normal coffee, with the exception that the water is force-fed through the coffee meal, resulting in the coffee being emulsified due to expansion after passing through the filter sieve, so that cream coffee is obtained. As soon as the selected amount has been reached, metering device 9 causes pump 6 to be stopped.

The coffee percolator diagrammatically shown in FIG. 2 includes substantially the same or similar elements as described above, although partially in a modified arrangement. The same or similar components are therefore designated by the same reference numerals, with an index added in case of modifications.

The inlet valve 11 is located in flow path 3' downstream of cold water supply inlet 1, followed by a metering device 9' also disposed upstream of divided flow path section 3'a. Metering device 9' is formed as a metering chamber containing three electrodes 19 located at different levels. Electrodes 19 are connected to control means 13 through control line 16' and serve to monitor the selected amount of coffee-making water. The first branch 4 of the divided flow path section 3'a includes pump 6, while second branch 5 includes a valve 21 adapted to be opened and closed via a control line 20. Associated with valve 21 is a choke means 22 located upstream thereof in the direction of flow from the cold water supply inlet. Downstream of divided section 3'a the flow path 3' includes through-flow heater 10.

The operating mode of the coffee precolator for making normal coffee is selected by depressing the respective pushbutton switch 18. This activates control means 13' to open inlet valve 11 and to energize through-flow heater 10. At the same time, the electrode 19 corresponding to the selected amount of coffee is activated in metering device 9. Water entering in the direction of arrow A then fills metering chamber 9' up to the selected level, whereupon control means 13' is again activated to close inlet valve 11, to open valve 21 and to start pump 6. The water contained in metering device 9' is then force-fed by pump 6 through first flow path branch 4 towards through-flow heater 10. In this case, the elevated pressure generated by pump 6 is immediately reduced, however, by permitting a fraction of the water to flow in the direction of arrow B through second flow path branch 5 including open valve 21 and choke means 22 to a point of flow path 3' upstream of pump 6. Choke means 22 may be suitably adjusted for maintaining the low pressure desired for making normal coffee in the flow path 3' downstream of pump 6.

If the preparation of espresso is selected by actuating the respective pushbutton switch 18, the control functions are the same as those described above, with the sole difference that valve 21 is not opened. This results in the metered water being fed to brewing unit 2 by pump 6 at the desired pressure of about 10 bar.

The invention is not limited to the described exemplary embodiments. In the embodiment of FIG. 1, for instance, check valve 7 may be replaced by a valve adapted to be opened and closed by control means 13, although this would involve a more complicated and expensive construction. The construction of the metereing and heating devices may likewise be varied, the described examples merely showing the most advantageous and economical solutions.

We claim:

1. A coffee percolator for selectively making normal coffee or esperesso, comprising:

a cold water supply inlet,
a brewing unit,
means for defining a flow path of the water between the cold water supply inlet and the brewing unit,
a metering device, and
means for heating the brewing water,
said water flow path means comprising:
an inlet valve,
a first branch including a pressure pump,
a second branch including a branch valve adapted to close for preparing espresso, and
control means adapted to activate said valves and/or said pump as required by the type of coffee to be made,
said flow path means being employed in common for the the brewing water used for making espresso and normal coffee and being divided only adjacent said pump into said first branch and said second branch.

2. Apparatus according to claim 1, characterized in that said inlet valve (11) is located downstream of the section (3a) of said flow path (3) that is divided into said branches (4 and 5), and that said second branch (5) includes a check valve (7) adapted to close in response to the pressure generated in said flow path (3) downstream of said pump (6) on activation of the latter, so that the heated water for making espresso is exclusively supplied by said pump (6) through said first branch (4), while the water for making normal coffee flows exclusively along said second branch (5) with the pump (6) deactivated.

3. Apparatus according to claim 1 or 2, characterized in that said heating means (10) is formed as a through-flow heater located downstream of said metering device (9) and of said divided section (3a) of said flow path (3).

4. Apparatus according to any of claim 3, characterized in that said metering device (9) is located downstream of said divided section (3a) of said flow path (3).

5. Apparatus according to any of claim 3, characterized in that a pressure reducer (8) is located adjacent said cold water supply inlet (1).

6. Apparatus at least in accordance with claim 1, characterized in that said branch valve (21) included in said second branch (5) is adapted to be opened by said control means (13') for making normal coffee, choke means (22) being provided upstream of said branch valve (21) in the direction of flow (A) from said water supply inlet (1), so that water for making normal coffee is adapted to be supplied by said pump (6) through said first branch (4) with simultaneous pressure equilibration through said second branch (5) back to said flow path (3') upstream of said pump.

7. Apparatus according to claim 6, characterized in that said branch valve (21) included in said second branch (5) is adapted to be closed by said control means (13') for making espresso, so that the espresso-making water is supplied under pressure from said pump (6) to said brewing unit (2) through said first branch (4).

8. Apparatus according to claim 6 or 7, characterized in that said metering device (9') is formed as a metering chamber located upstream of said divided section (3'a) of said flow path (3').

9. Apparatus according to any of claim 8, characterized in that said inlet vlave (11) is located adjacent said cold water supply inlet (1).

10. In a coffee percolator for selectivley making normal coffee or espresso, the percolator including a cold water supply inlet and means for heating the water, the improvement comprising:
a water flow path between said inlet and said heating means for conveying water to make either normal coffee or espresso,
the path having first and second, parallel, water conveying branches, the first branch including a pressure pump and the second branch having a valve,
the valve being operable to restrict water flow through the second branch for making espresso and to permit water flow through the second branch for making normal coffee.

11. The improvement of claim 10, wherein for making normal coffee said pressure pump is inoperable and water flows through the second branch.

12. The improvement of claim 10, wherein for making normal coffee said pressure pump is operable for conveying water through said first branch and the second branch operates to reduce the pressure of the water supplied to the heating means.

* * * * *

UNITED STATES PATENT AND TRADEMARK OFFICE
CERTIFICATE OF CORRECTION

PATENT NO. : 4,583,449

DATED : April 22, 1986

INVENTOR(S) : Artur Dangel, Josef Frech, Willi Niess, Rold Prillip (deceased), Hermann Riegert, Gerhard Wittlinger and Siegfried Anderl It is certified that error appears in the above-identified patent and that said Letters Patent is hereby corrected as shown below:

In Column 4, line 68, please delete the word "esperesso" and insert -- espresso --.

In Column 5, line 16, please delete the second "the".

In Column 5, line 36, please delete the words "any of".

In Column 5, line 39, please delete the words "any of".

In Column 6, line 19, please delete the words "any of".

In Column 6, line 22, please delete the word "selectivley" and insert -- selectively --.

Signed and Sealed this

Nineteenth Day of August 1986

[SEAL]

Attest:

Attesting Officer

DONALD J. QUIGG

Commissioner of Patents and Trademarks